Patented July 29, 1941

2,250,667

UNITED STATES PATENT OFFICE 2,250,667

POLISHING COMPOSITION AND THE METHOD OF PREPARING THE SAME

Walter A. Hall, Flint, Mich., assignor to E. I. du Pont de Nemours & Company, Wilmington, Del., a corporation of Delaware No Drawing. Application April 22, 1938, Serial No. 203,589

9 Claims. (Cl. 106—5)

This invention relates to polishing compositions, and more particularly, to an improved polishing composition for smooth, painted surfaces such as lacquered or enameled metal automobile bodies and the like.

Polishing compositions and their manufacture constitute an old and well-known art. Such compositions of a type adaptable for use on smooth, painted or enameled surfaces, while relatively recent in development, are quite familiar to those experienced in the art. One popular type of polish today generally consists of an oil dispersed in an aqueous gum solution, in which is suspended a mild abrasive. Other substances are usually added in small quantities to effect certain improvements and modifications in working and keeping qualities. The gums generally used belong to the class of vegetable gums which includes gum tragacanth, gum karaya, and gum arabic. The abrasive is usually a soft, siliceous substance such as diatomaceous earth. The oil may be either a light fraction derived from petroleum or a mixture thereof with a vegetable oil or wax.

It has been found in practice, however, that polishing compositions of the type described above are more or less unsatisfactory because they require considerable time and labor to polish out to a satisfactory degree of lustre without smearing or showing streaks. This is particularly true in areas where the climate is inclined to be humid and the rainfall heavy. While better performance of such compositions is observed in areas where more arid weather prevails, it so happens that the latter areas are much less densely populated, so that the demand for polishing compositions is greatest in more humid climates. It has been discovered in the present invention, as shown below, that methyl cellulose, dispersed in the water phase, has the effect of improving the performance of the popular type of polishing composition, in that the tendency to show smears and streaks is minimized by its presence.

This invention has as an object a polishing composition which will, when applied to a painted or lacquered metal surface, impart a high degree of luster and a pleasing appearance to the surface, with comparatively little effort. A further object is a polishing composition which will perform under a wide variety of weather conditions, particularly atmospheric humidity, without streaking or smearing on the surface to which it is applied. Other objects will appear hereinafter.

These objects are accomplished by adding water-soluble methyl cellulose to a dispersion of a polishing oil and an abrasive in an aqueous preparation containing gum tragacanth as the suspending agent.

The product of this invention in its preferred form consists of two phases: the aqueous, or continuous phase; and the oily, or dispersed phase. To form the aqueous phase, gum tragacanth is stirred with hot water to which formaldehyde has been added, and the mass is allowed to soak for a number of hours. Separately, water-soluble methyl cellulose is soaked for a number of hours in hot water. Following the soaking period, these two dispersions are each diluted somewhat with water and stirred until smooth and free from lumps. They are then mixed together and warm water is added, as well as the abrasive and a small amount of glycerine. Meanwhile, the oily phase is prepared by melting small amounts of beeswax and carnauba wax and adding polishing oil, the heating being continued until a clear solution is obtained. This solution is added slowly to the aqueous phase with continued stirring to effect emulsification. Coloring matter and odorants are next dispersed in the mixture. A small quantity of neutral sulfonated castor oil is added as an auxiliary emulsifying agent and, finally, formaldehyde is added as a preservative.

*Example 1*

The following example is given as a preferred polishing composition employing the substance indicated above:

|   | Per cent |
|---|---|
| Gum tragacanth | 0.18 |
| Formaldehyde | 1.06 |
| Water | 71.04 |
| Methyl cellulose | 0.14 |
| Glycerine | 2.91 |
| Diatomaceous earth | 11.10 |
| Beeswax | 0.28 |
| Carnauba wax | 0.02 |
| Neutral oil | 12.38 |
| Amyl acetate | 0.19 |
| Ferric oxide | 0.20 |
| Turkey red oil | 0.50 |
|   | 100.00 |

Other compositions which are illustrative of my invention are as follows:

Example 2

| | Per cent |
|---|---|
| Gum tragacanth | 0.18 |
| Formaldehyde | 1.06 |
| Water | 70.78 |
| Methyl cellulose | 0.28 |
| Glycerine | 2.90 |
| Diatomaceous earth | 11.10 |
| Beeswax | .28 |
| Carnauba wax | .02 |
| Neutral oil | 12.40 |
| Amyl acetate | .30 |
| Ferric oxide | .20 |
| Turkey red oil | .50 |
| | 100.00 |

Example 3

| | Per cent |
|---|---|
| Gum tragacanth | 0.18 |
| Formaldehyde | 1.06 |
| Water | 70.64 |
| Methyl cellulose | 0.42 |
| Glycerine | 2.90 |
| Diatomaceous earth | 11.10 |
| Beeswax | .28 |
| Carnauba wax | .02 |
| Neutral oil | 12.40 |
| Amyl acetate | .30 |
| Ferric oxide | .20 |
| Turkey red oil | .50 |
| | 100.00 |

Example 4

| | Percent |
|---|---|
| Gum tragacanth | 0.18 |
| Formaldehyde | 1.06 |
| Water | 70.50 |
| Methyl cellulose | 0.56 |
| Glycerine | 2.90 |
| Diatomaceous earth | 11.10 |
| Beeswax | .28 |
| Carnauba wax | .02 |
| Neutral oil | 12.40 |
| Amyl acetate | .30 |
| Ferric oxide | .20 |
| Turkey red oil | .50 |
| | 100.00 |

Experience has indicated that the minimum operating temperatures for satisfactory dispersion, consistent with saving of time, are 40° C. for the aqueous phase and 60° C. for the oily phase. Slightly higher temperatures may be employed but in either case should not exceed 90° C.

The ingredients may be varied to some extent, but it will be found that best results are obtained within the following ranges:

| | Percent |
|---|---|
| Gum tragacanth | 0.15– 1.0 |
| Methyl cellulose | 0.07– 1.10 |
| Diatomaceous earth | 0–30 |
| Neutral oil | 5–30 |
| Beeswax | 0– 1.0 |
| Carnauba wax | 0– 2.0 |
| Turkey red oil | 0– 1.0 |
| Water | 40–90 |

It is to be understood that while the examples are illustrated by the use of methyl cellulose, the invention is not so limited since homologues such as ethyl cellulose and those which can be obtained in a water-soluble form similar to methyl cellulose are also operable. Therefore, in the claims, the term water-soluble methyl cellulose is to be construed in a generic sense including the similar acting water-soluble homologues.

It has also been found that a ratio of 18 to 14 for the amounts used of gum tragacanth and methyl cellulose, respectively, gives the best results although some variation is permissible without sacrificing all of the desired working properties.

The ratio of waxes to oil given above need not be rigidly adhered to since satisfactory polishing properties are obtained with two or three times the amount of wax shown.

While I do not intend to be limited by any theory or explanation, it appears at present that the particles of methyl cellulose, by virtue of their fibrous character even when dispersed in water, having a matting effect when the polish film is allowed to dry on the surface. The mat so formed acts as an interlocking medium which binds the gum tragacanth and diatomaceous earth particles, which are wet by the glycerine, into a more coherent mass. This effect is believed to be evidenced by a somewhat crusty nature of the dried film. When the excess is subsequently removed in the polishing operation, its crusty character permits it to be broken up and wiped off more easily and completely, so that streaking and smearing are minimized.

The polishing composition described above is generally useful for imparting a high luster to all kinds of smooth, painted metal surfaces. It is principally useful for polishing automobile bodies finished with various types of coating compositions, including pigmented nitrocellulose lacquers, enamels containing either natural or synthetic resin vehicles, or combinations thereof, asphaltic varnishes and pigmented derivatives thereof, etc. Its use is not confined to automobile bodies, however; it may be used wherever it is desired to impart a high luster to paint applied over smooth metal surfaces. Thus, it finds wide application in the field of furniture and building partitions, particularly those made of metal; for burial caskets, painted household heating stoves, and for many objects having similar surfaces. The composition is applied to the surface to be polished after most of the dirt and grit has been removed. The polish is applied to a cloth pad which has been previously dampened if the climate is very dry. It is then rubbed vigorously until all chalked pigment and dirt film are thoroughly loosened. After it has been allowed to dry, it is wiped off and polished with a clean dry cloth.

The polishing compositions herein described possess the advantage over other polishes of imparting a high luster to a surface with less rubbing effort. When applied in the usual manner by rubbing a small quantity over the surface until a uniform thin film is deposited thereon, and allowed to dry, this composition lays down a film which is relatively dry and crusty in character, without being too adherent to the surface. As a result of this film characteristic, the removal of the film by rubbing is facilitated to the extent that no streaking or smearing occurs in the oil film remaining on the surface. In addition, the oil film does not tend to retain finger-marks or similar blemishes. In such working characteristics the polishing composition described above is definitely superior in performance to other known polishes.

It is apparent that many widely different embodiments of this invention may be made without departing from the spirit and scope thereof; and, therefore, it is not intended to be limited except as indicated in the appended claims.

I claim:

1. An emulsion polishing composition comprising an oil, an abrasive, a matting agent comprising essentially water soluble methyl cellulose, and gum tragacanth, said methyl cellulose and gum tragacanth being present in amount between .07–1.10% and .15–1.0%, respectively.

2. In an emulsion polishing composition containing water and an oil the combination of a matting agent comprising essentially water soluble methyl cellulose and gum tragacanth, said methyl cellulose and gum tragacanth being present in amount between .07–1.10% and .15–1.0%, respectively.

3. The process of preparing polishing compositions which comprises stirring gum tragacanth with hot water and allowing the mass to soak for a few hours, similarly preparing a separate mass of water soluble methyl cellulose, mixing the same, adding thereto an abrasive and glycerin, preparing a separate dispersion by melting a wax, and adding an oil thereto, heating until a clear solution is obtained and thereafter mixing this dispersion with the previously prepared mixture of aqueous dispersions.

4. A polishing composition having substantially the following composition by weight:

| | Percent |
|---|---|
| Gum tragacanth | 0.18 |
| Formaldehyde | 1.06 |
| Water | 71.04 |
| Methyl cellulose (water soluble) | 0.14 |
| Glycerine | 2.91 |
| Diatomaceous earth | 11.10 |
| Beeswax | 0.28 |
| Carnauba wax | 0.02 |
| Neutral oil | 12.38 |
| Amyl acetate | 0.19 |
| Ferric oxide | 0.20 |
| Turkey red oil | 0.50 |
| | 100.00 |

5. A polishing composition having a formula within the following range:

| | Percent |
|---|---|
| Gum tragacanth | 0.15–1.0 |
| Methyl cellulose | 0.07–1.10 |
| Diatomaceous earth | 0–30 |
| Neutral oil | 5–30 |
| Beeswax | 0–1.0 |
| Carnauba wax | 0–2.0 |
| Turkey red oil | 0–1.0 |
| Water | 40–90 |

6. An emulsion of the oil-in-water type having a formula within the following range:

| | Percent |
|---|---|
| Gum tragacanth | 0.15–1.0 |
| Methyl cellulose | 0.07–1.1 |
| Abrasive | 0–30 |
| Neutral oil | 5–30 |
| Water | 40–90 |

7. An emulsion polishing composition of the oil-in-water type comprising an emulsifying agent of the bodying type, a matting agent consisting essentially of methyl cellulose, an oil, and water.

8. In a polishing composition of the oil-in-water emulsion type, the combination of an emulsifying agent of the bodying type and a matting agent comprising essentially water soluble methyl cellulose.

9. An emulsion polishing composition of the oil-in-water type comprising a neutral oil, water, abrasive, gum tragacanth, and methyl cellulose, the ratio of the gum tragacanth to methyl cellulose being approximately 18 to 14.

WALTER A. HALL.